United States Patent
Iida et al.

(10) Patent No.: US 6,705,068 B2
(45) Date of Patent: Mar. 16, 2004

(54) LAWN MOWER

(75) Inventors: Tetsuo Iida, Wako (JP); Takao Kobayashi, Wako (JP); Shoji Hasei, Wako (JP); Kenzo Shimada, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/245,409

(22) Filed: Sep. 17, 2002

(65) Prior Publication Data
US 2003/0066280 A1 Apr. 10, 2003

(30) Foreign Application Priority Data

Oct. 4, 2001 (JP) ........................................ 2001-309120

(51) Int. Cl.[7] .............................................. A01D 34/70
(52) U.S. Cl. ....................................... 56/202; 56/320.2
(58) Field of Search ................................ 56/16.6, 16.7, 56/17.5, 202, 203, 320.1, 320.2

(56) References Cited

U.S. PATENT DOCUMENTS

| 4,631,909 A | * | 12/1986 | McLane | 56/202 |
| 4,848,070 A | * | 7/1989 | Berglund | 56/202 |
| 5,447,020 A | * | 9/1995 | Dunn | 56/12.8 |
| 5,678,399 A | * | 10/1997 | Baron | 56/320.2 |

FOREIGN PATENT DOCUMENTS

| JP | 63066423 | 5/1988 |
| JP | 63071622 | 5/1988 |

* cited by examiner

*Primary Examiner*—Robert E. Pezzuto
(74) *Attorney, Agent, or Firm*—Adams & Wilks (57) ABSTRACT

A lawn mower includes a mower body and a grass bag provided at the rear of the mower body. The mower body has a cutter deck rotatably accommodating a cutter blade, a carrying passage for guiding grass clippings into the grass bag, and an air return passage for guiding only air from the grass bag into the cutter deck. Cutter deck-facing openings of the air return passage are opened in line with the rotating track of airlifts provided at the opposite ends of the cutter blade. A swirling airflow inside the cutter deck induced by the rotation of the cutter blade is in the same direction as that of air returned via the air return passage, resulting in a smooth airflow inside the cutter deck.

16 Claims, 7 Drawing Sheets

ововhere# LAWN MOWER

FIELD OF THE INVENTION

This invention relates generally to a lawn mower and, more particularly, to an air-circulation lawn mower wherein grass clippings are carried with carrier air into a grass bag via a carrying passage and only air is returned into a cutter deck of a mower body via an air return passage extending from the grass bag to the cutter deck.

BACKGROUND OF THE INVENTION

Air-circulation lawn mowers are disclosed in, e.g., Japanese Utility Model Laid-Open Publication No. SHO-63-66423 entitled "Anti-dust-scattering Structure for Grass Cutting Machine" and Japanese Utility Model Laid-Open Publication No. SHO-63-71622 entitled "Grass Collecting Device for Grass Cutting Machine."

The grass cutting machine of SHO-63-66423 is configured to produce an airflow by sucking air inside from the outside of a cutting blade casing, discharge grass cut by the cutting blade into a catcher with the airflow and circulate air from the catcher into the cutting blade casing.

This grass cutting machine is, however, configured to return air into the center of the cutting blade casing. Since a drive member for rotating the cutting blade is positioned in the midsection of the cutting blade casing, it is necessary to form a circuitous path around the drive member or prevent leakage of air, resulting in a complicated structure.

The grass cutting machine of SHO-63-71622 is configured to form an air circulation path by connecting a discharge opening of a cutting section and an intake of a grass bag with a grass carrying passage and connecting the grass bag and the cutting section with an air passage B.

However, the grass collecting device of this grass cutting machine is configured to return air into a rear portion of the cutting section 5, and requires right angle bending of airflow returned into the cutting section, undesirably causing pressure loss. Further, the grass collecting machine is configured to discharge air outside, producing large noise and discharging dust.

In this context, a lawn mower which allows sufficient production of pressure differential for returning air into a cutter deck and allows reduction in pressure loss is desired.

SUMMARY OF THE INVENTION

According to the present invention, there is provided a lawn mower, which comprises a mower body; a drive source mounted on the mower body; a cutter blade driven by the drive source for rotation, the cutter blade having airlifts at opposite ends thereof; and a grass bag provided at the rear of the mower body for receiving grass cut by the cutter blade. The mower body comprises a cutter deck accommodating the cutter blade in a rotatable manner; a grass carrying passage for guiding grass cut by the cutter blade into the grass bag; and an air return passage for guiding only air from the grass bag into the cutter deck, the air return passage being formed on an upper surface of the cutter deck, and a cutter deck-facing opening of the air return passage being arranged in line with the rotating track of the airlifts.

In order to return air inside the grass bag into the cutter deck, effective pressure differential is required between the grass bag and the cutter deck. In the present invention, the air return passage is formed on an upper inside surface of the cutter deck and the cutter deck-facing opening of the air return passage is opposed to the rotating track of the airlifts of the cutter blade. Return air is thus drawn from the cutter deck-facing opening into the cutter deck by use of a swirling flow caused by the rotation of the cutter blade. This allows efficient air circulation from the grass bag toward the inside of the cutter deck, resulting in reduction in noise of the lawn mower and dust.

The cutter deck-facing opening of this invention is preferably oriented such that air jetting out from the opening is in line with a flow of air inside the cutter deck produced by rotation of the cutter blade. This eliminates a counter flow against a flow of air produced inside the cutter deck, leading to a smooth flow of air inside the cutter deck. In particular, disposing the cutter deck-facing opening on the opposite side of the grass carrying passage with a rotating shaft of the cutter blade interposed therebetween reduces pressure loss at the air return passage.

A grass bag-facing opening of the air return passage is opened upward. This facilitates separation between grass clippings and carrier air.

The grass bag of this invention preferably comprises a permeable partition wall separating the grass carrying passage and the air return passage, thereby having separated upper and lower chambers, the upper chamber being connected to the air return passage and the lower chamber being connected to the grass carrying passage. That is, separating the grass bag into upper and lower chambers by forming the permeable partition wall prevents grass clippings from entering the upper chamber so that only air with glass clippings removed is returned into the cutter deck.

The cutter deck-facing opening of this invention may be formed not to protrude toward the cutter deck, or may have a front end cut and bent upward and a rear end cut and bent downward, or may comprise two openings formed by cutting and bending downward a portion ahead of the midpoint of the opening and cutting and bending upward a portion behind the midpoint.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
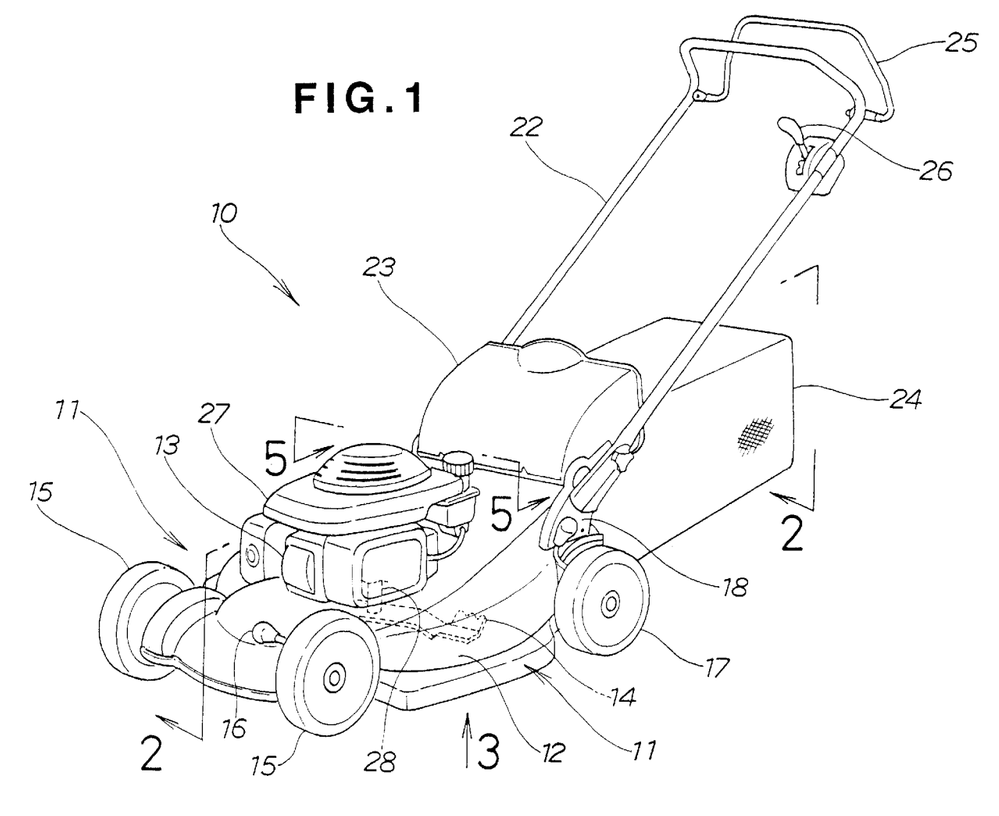
FIG. 1 is a perspective view of a lawn mower according to the present invention.
Figure 2:
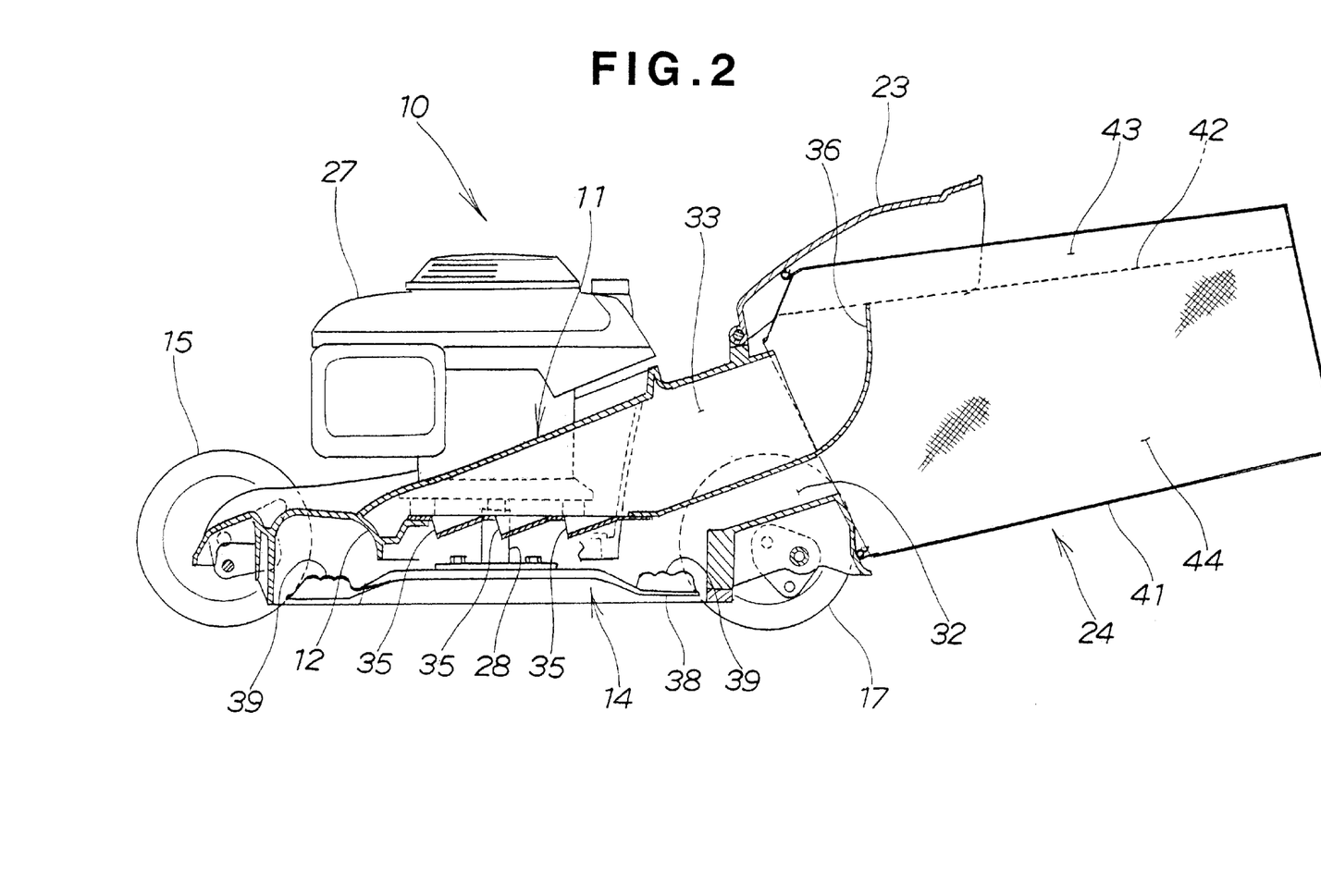
FIG. 2 is a cross-sectional view of the lawn mower, taken along line 2—2 in FIG. 1.

Referring to FIGS. 1 and 2, a lawn mower 10 of the present embodiment is a self-propelled lawn mower having an engine 13 as a drive source for rotating a cutter blade 14 and driving rear wheels 17. The engine 13 is mounted on a mower body 11. A head cover 27 is attached to an upper portion of the engine 13. The cutter blade 14 is attached to a rotating shaft 28 as an output shaft of the engine 13. Rotation of the cutter blade 14 is controlled with a cutter lever 25. An operator grips a handle 22 and operates a speed change lever 26 for mowing. Grass cut by the rotation of the cutter blade 14 is carried into a grass bag 24.

Reference numerals 15 denote front wheels, 16 a front height adjustment mechanism, and 18 a rear height adjustment mechanism. A grass cover 23 is mounted between the mower body 11 and the grass bag 24 for preventing outward discharging of grass clippings.

The lawn mower 10 of this embodiment is, as will be described below, an air-circulation lawn mower for returning air inside the grass bag into the cutter deck 12 of the mower body 11 after carrying grass clippings into the grass bag 24. The detail will be described below.

As shown in FIG. 2, the mower body 11 has the cutter deck 12, a grass carrying or grass discharge passage 32 (hereafter simply grass carrying passage), and an air return passage 33. The cutter deck 12 accommodates the cutter blade 14 in a rotatable manner. The grass carrying passage 32 extends rearward from the rear of the cutter deck 12 and guides grass clippings into the grass bag 24 with carrier air. The air return passage 33 guides only air into the cutter deck 12, leaving only the carried grass clippings in the grass bag.

Figure 3:
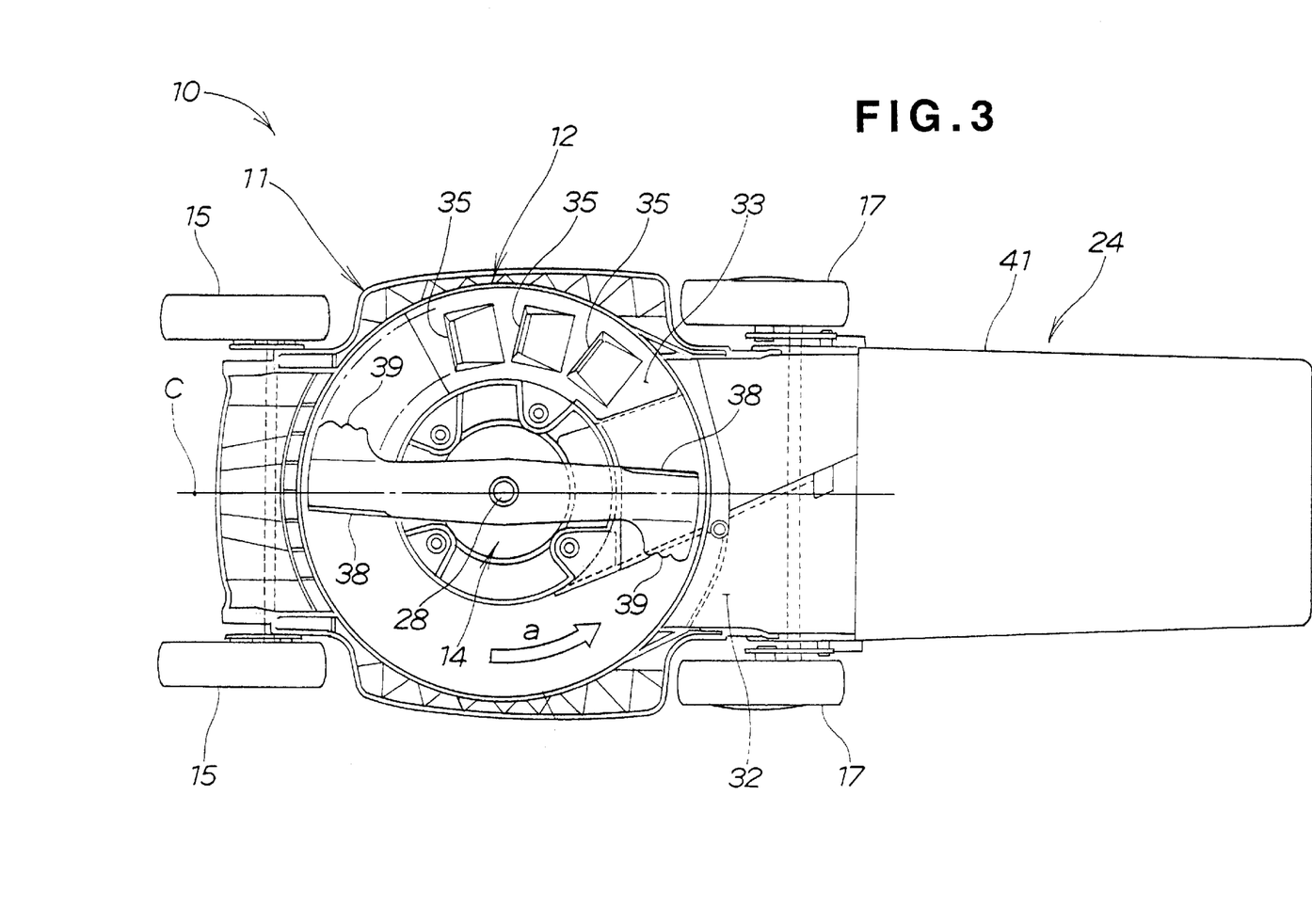
FIG. 3 is a bottom plan view of the lawn mower, taken from the direction of arrow 3 of FIG. 1.
Figure 5:
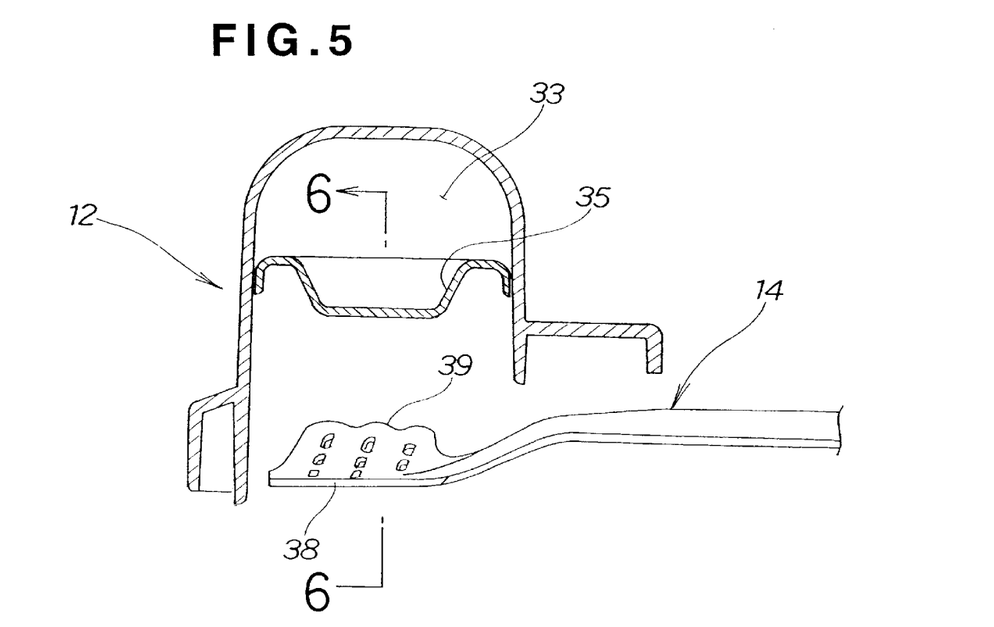
FIG. 5 is a cross-sectional view taken along line 5—5 of FIG. 1.

The air return passage 33 has a plurality of cutter deck-facing openings 35 communicating with the inside of the cutter deck 12 and a grass bag-facing opening 36 communicating with the grass bag 24. The cutter deck-facing openings 35 are formed in an upper portion of the cutter deck 12 and arranged in line with the rotating track or circular path of travel of the airlifts 39, 39 of the cutter blade 14. That is, the cutter deck-facing openings 35 are vertically aligned with the circular path of travel of the airlifts 39, 39 as shown in FIGS. 3 and 5.

The grass bag-facing opening 36 is opened upward. Air is light and grass clippings are heavier than air, opening upward the grass bag-facing opening 36 of the air return passage 33 thus facilitates the separation between grass clippings and air.

The cutter blade 14 has cutting parts 38, 38 (See FIG. 3) positioned forward with respect to the rotation direction and airlifts 39, 39 formed by curving portions positioned rearward with respect to the rotation direction upward from the cutting parts 38, 38.

When the cutter blade 14 is rotated, negative pressure (lower than atmospheric pressure) produced below the airlifts 39, 39 raises grass on the ground, and the grass is cut by the cutting portions 38, 38. The cut grass is struck by the upper surfaces of the airlifts 39, 39, put into a swirling flow induced by the rotation of the cutter blade 14, and carried into the grass bag 24 with carrier air.

The grass bag 24 has a body 41 with reduced permeability, a permeable partition wall 42 dividing the inside of the body 41 into upper and lower portions, and an upper chamber 43 and a lower chamber 44 provided by the permeable partition wall 42. The grass bag-facing opening 36 of the air return passage 33 is connected to the upper chamber 43. The outlet of the grass carrying passage 32 is connected to the lower chamber 44. In other words, the grass bag 24 is divided into upper and lower chambers by the provision of the permeable partition wall 42 separating the grass carrying passage 32 and the air return passage 33.

The permeable partition wall 42 is a filter capable of separating air from grass clippings, and is a member for collecting grass clippings in the lower chamber 44 and passing only air into the upper chamber 43. Thus complete separation between grass clippings and air is provided, and only air with grass clippings removed is returned into the cutter deck 12.

Figure 4:
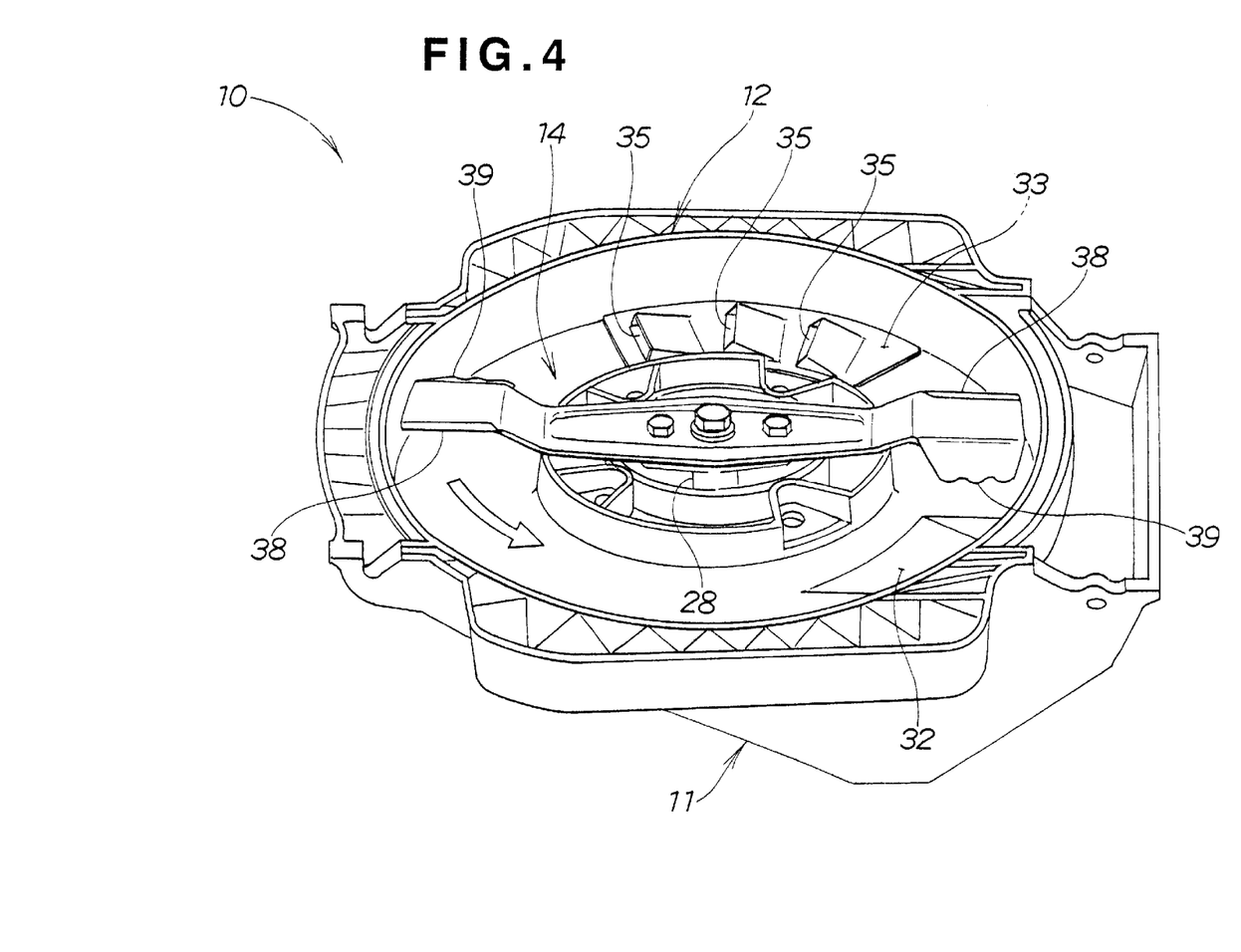
FIG. 4 is a perspective view of a cutter deck according to the present invention shown in FIG. 3.

As shown in FIGS. 3 and 4, the cutter deck-facing openings 35 of the air return passage 33 are brought into line with the rotating track of the airlifts 39, 39 of the cutter blade 14. The rotation direction of the cutter blade 14 is counter-clockwise as shown by open arrow a. That is, flows of air jetting out from the cutter deck-facing openings 35 are brought into line with the rotation direction of the cutter blade 14. The cutter deck-facing openings 35 are disposed on the opposite side of the grass carrying passage 32 with longitudinal centerline C passing through the rotating shaft 28 interposed therebetween.

The air return passage 33 is thus formed on an upper inside surface of the cutter deck 12. The cutter deck-facing openings 35 of the air return passage 33 are formed to face the rotating track of the airlifts 39, 39 of the cutter blade 14.

In order to efficiently return air inside the grass bag 24 (See FIG. 2) into the cutter deck 12, effective pressure differential is required between the grass bag 24 and the cutter deck 12.

As shown in FIG. 5, the air return passage 33 is formed on an upper surface of the cutter deck 12 and the cutter deck-facing openings 35 of the air return passage 33 are opposed to the rotating range of the airlifts 39 of the cutter blade 14. Return air is drawn from the cutter deck-facing openings 35 into the cutter deck 12 by use of negative pressure produced by a swirling flow caused by the rotation of the cutter blade 14. This allows efficient air circulation from the grass bag 24 (See FIG. 2) toward the inside of the cutter deck 12, resulting in reduction in noise and dust.

Thus opposing the cutter deck-facing openings 35 of the air return passage 33 to the rotating track of the airlifts 39 of the cutter blade 14 provides a simplified structure for efficient air circulation as compared with the case of returning air into the midsection of the cutter deck 12.

Figure 6:
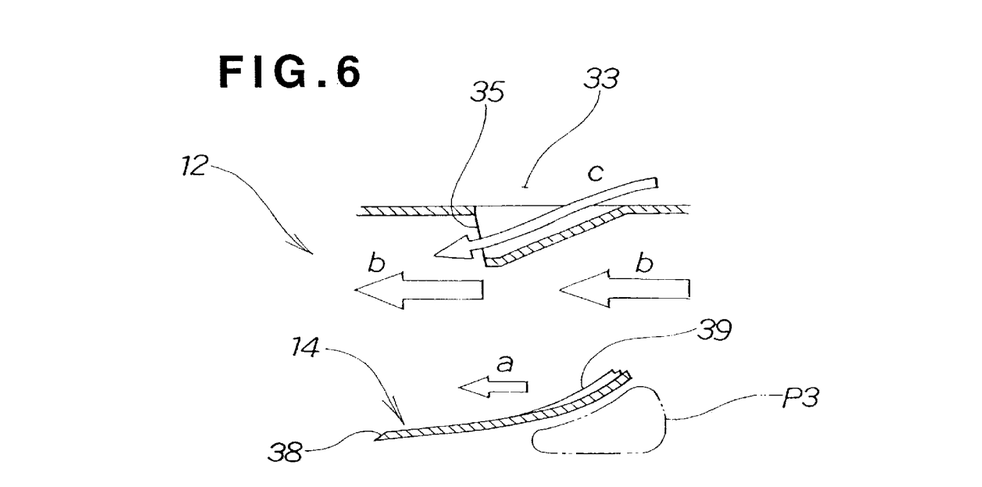
FIG. 6 is a cross-sectional view taken along line 6—6 of FIG. 5.

FIG. 6 illustrates return air drawn from the cutter deck-facing opening 35 into the cutter deck 12.

Rotation of the cutter blade 14 in the direction of arrow a produces a swirling flow as shown by arrows b, b inside the cutter deck 12. The swirling flow draws air from the cutter deck-facing openings 35 into the cutter deck 12 as shown by arrow c as in a venturi tube.

Reference numeral P3 denotes a negative pressure (lower than atmospheric pressure) zone produced below the airlift 39 by rotating the cutter blade 14.

The reason why negative pressure is produced by a swirling flow inside the cutter deck 12 is as follows:

Provision of an opening (cutter deck-facing opening 35) in parallel with a swirling flow having a certain velocity causes air to be drawn into the swirling flow like in an atomizer (or venturi tube). This produces negative pressure at the opening (cutter deck-facing opening 35).

The parallel opening is fixed with respect to the swirling flow having the certain velocity. This relation can be compared to the state where the opening is rotated in a direction opposite to the swirling flow when the swirling flow is assumed to be fixed. This state is very close to the state below the airlift 39 of the rotating cutter blade 14 (where negative pressure zone P3 is produced). Large negative pressure is thus produced at the opening (cutter deck-facing opening 35) fixed with respect to the swirling flow.

Now, a flow of air in the lawn mower 10 according to this embodiment will be described with reference to FIGS. 7A and 7B.

Figure 7A:
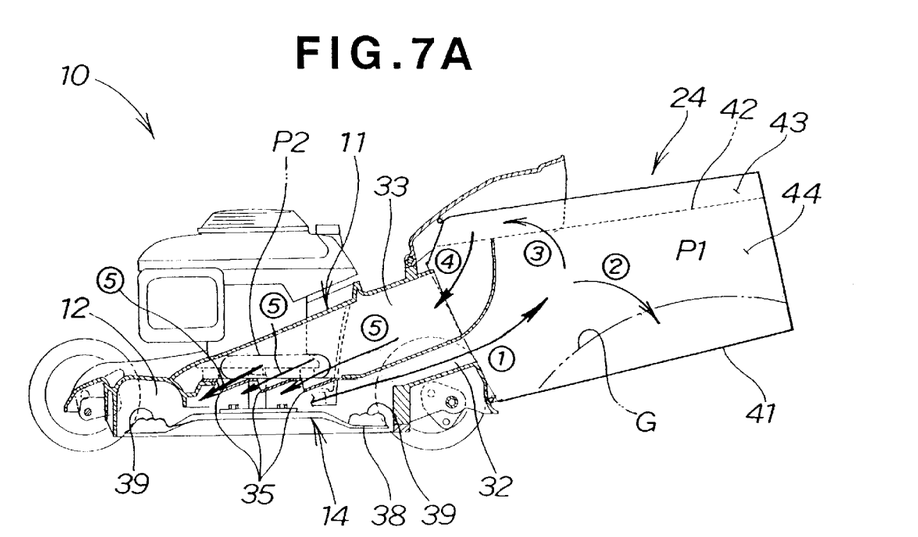
FIGS. 7A and 7B illustrate flows of air between the cutter deck and a grass bag, FIG. 7A illustrating flows of air viewed from the side of the lawn mower and FIG. 7B illustrating flows of air viewed from the bottom of the lawn mower.

In FIG. 7A, when the cutter blade 14 rotates, a negative pressure (negative pressure zone P3) is first produced below the airlifts 39, 39. The negative pressure raises grass on the ground. The cutting parts 38, 38 cut the grass. The cut grass G is struck on the upper surfaces of the airlifts 39, 39, put into a swirling flow induced by the rotation of the cutter blade 14, and carried into the grass bag 24 with the carrier air.

The carrier air always forms a positive pressure (larger than atmospheric pressure) inside the grass bag 24. The swirling flow forms a negative pressure in the vicinity of the cutter deck-facing openings 35 of the air return passage 33. With the pressure inside the grass bag 24 as P1 and the pressure in the vicinity of the cutter deck-facing openings 35 of the air return passage 33 as P2, P1>P2. This allows efficient circulation of The air circulation will be described in the order of events. A swirling flow produced by the rotation of the cutter blade 14 carries the cut grass G from the grass carrying passage 32 into the lower chamber 44 of the grass bag 24 with the carrier air as shown by arrow ①. The cut grass G is accumulated inside the lower chamber 44 of the grass bag 24 as shown by arrow ②. Air with debris and dust removed by the permeable partition wall 42 is sent from the lower chamber 44 into the upper chamber 43 as shown by arrow ③. The air is returned from the upper chamber 43 of the grass bag 24 into the air return passage 33 as shown by arrow ④. The air is returned from the cutter deck-facing openings 35 of the air return passage 33 into the cutter deck 12 as shown by arrows ⑤. Air is thus circulated as shown by arrows ① to ⑤, thereby to reduce noise and dust during mowing operation. This results in the protection of an operator and the preservation of the surrounding environment.

Figure 7B:
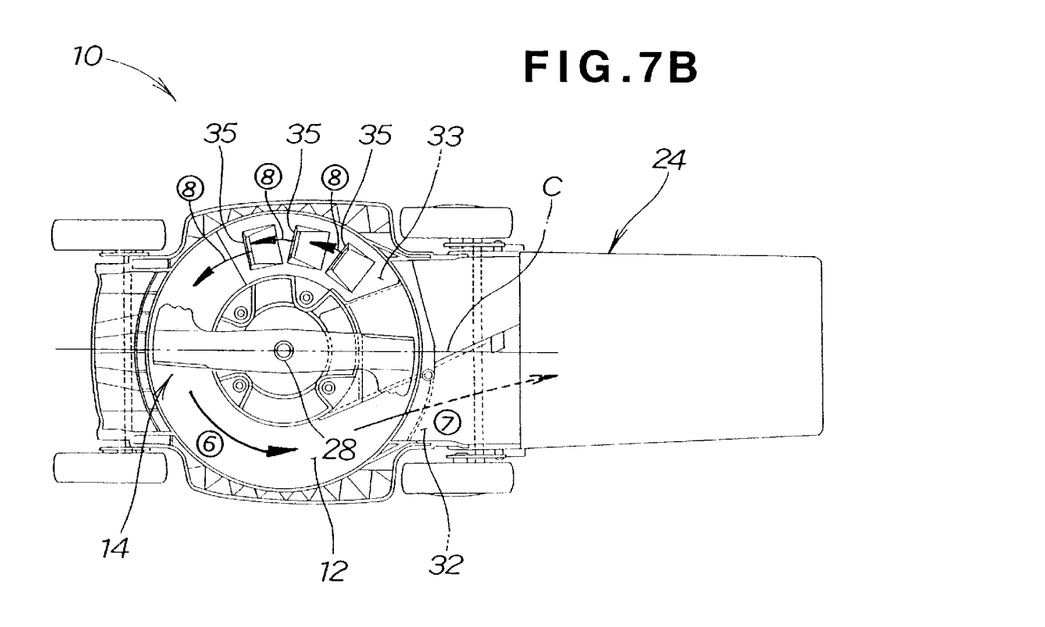

As shown in FIG. 7B, rotation of the cutter blade 14 produces a swirling flow shown by arrow ⑥ inside the cutter deck 12, and grass clippings are carried through the grass carrying passage 32 into the grass bag 24 with carrier air as shown by arrow ⑦. Return air is drawn from the cutter deck-facing openings 35 of the air return passage 33 into the cutter deck 12 as shown by arrows ⑧.

That is, the cutter deck-facing openings 35 are oriented such that air jetting out form the openings 35 is in line with the flow of air (swirling flow) inside the cutter deck 12. Air jetting out from the openings 35 thus does not counter the flow of air produced by rotation inside the cutter deck 12 but instead flows in the same direction therewith, resulting in a smooth flow of air inside the cutter deck 12. More specifically, the openings 35 are opened in a direction along the flow of air inside the cutter deck 12 and disposed on the opposite side of the grass carrying passage 32 with the rotating shaft 28 of the cutter blade 14 interposed therebetween. This provides a smooth flow of air, reducing pressure loss at the air return passage 33.

Figure 8:
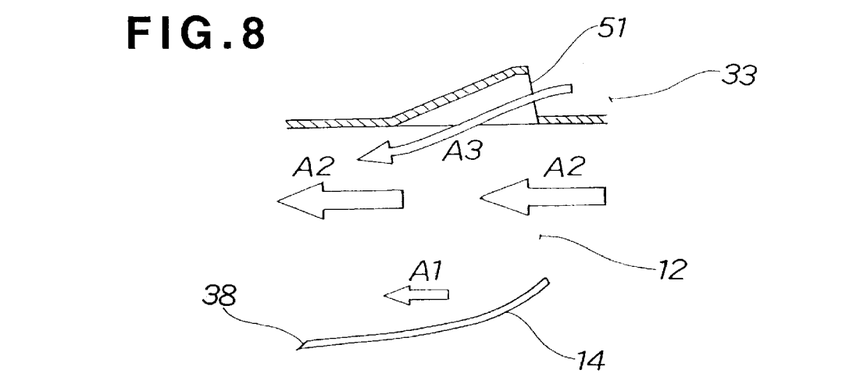
FIG. 8 is a cross-sectional side view of a cutter deck-facing opening according to another embodiment of the present invention.

FIG. 8 illustrates a cutter deck-facing opening of another embodiment. A cutter deck-facing opening 51 of this embodiment is formed by cutting and bending a portion toward an air return passage 33, and is prevented from protruding inside a cutter deck 12. This results in improvement in space efficiency of the cutter deck 12. A1 denotes the rotation direction of a cutter blade 14, A2 a swirling flow, and A3 a return air flow.

Figure 9:
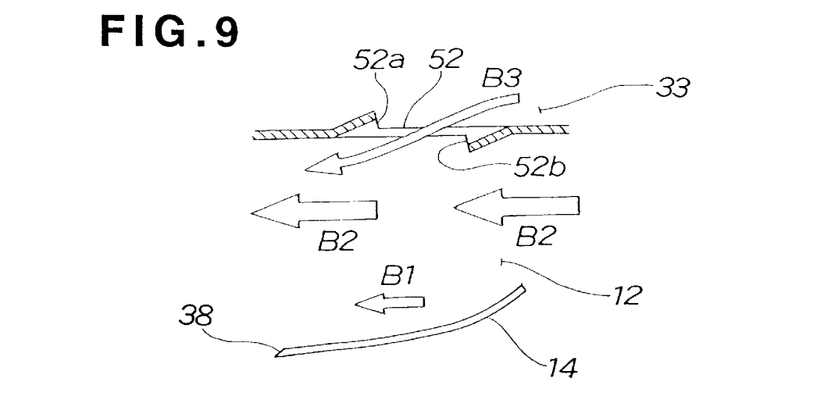
FIG. 9 is a cross-sectional side view of a cutter deck-facing opening according to still another embodiment of the present invention.

FIG. 9 illustrates a cutter deck-facing opening of still another embodiment. A cutter deck-facing opening 52 of this embodiment has a front end 52a cut and bent upward and a rear end 52b cut and bent downward. B1 denotes the rotation direction of a cutter blade 14, B2 a swirling flow, and B3 a return air flow.

Figure 10:
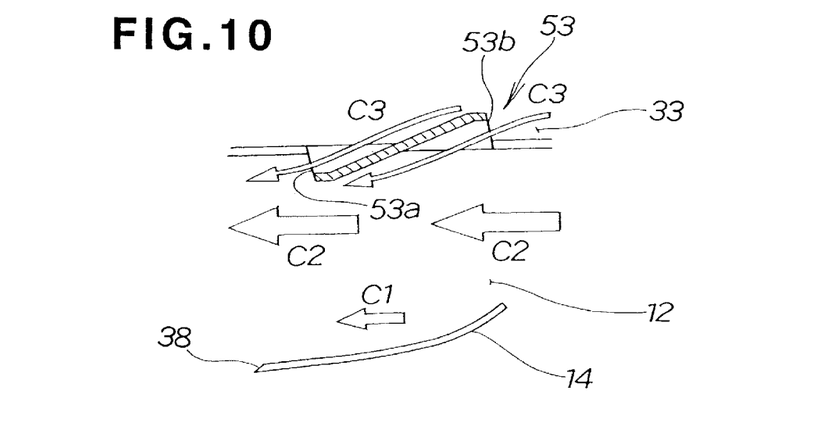
FIG. 10 is a cross-sectional side view of a cutter deck-facing opening according to still another embodiment of the present invention.

FIG. 10 is a cutter deck-facing opening of still another embodiment. A cutter deck-facing opening 53 of this embodiment has two openings, a front opening 53a with a portion ahead of the midpoint of the opening cut and bent downward and a rear opening 53b with a portion behind the midpoint of the opening cut and bent upward. C1 denotes the rotation direction of a cutter blade 14, C2 a swirling flow, and C3 an air return flow.

In the embodiment shown in FIG. 4, the air return passage 33 is disposed on the left of body centerline C when viewed from the bottom and the grass carrying passage 32 is disposed on the right of body center line C. This arrangement is not intended to be limiting. The grass carrying passage 32 and the air return passage 33 may be provided in the opposite arrangement.

The present disclosure relates to the subject matter of Japanese Patent Application No. 2001-309120, filed Oct. 4, 2001, the disclosure of which is expressly incorporated herein by reference in its entirety.

What is claimed is:

1. A lawn mower, comprising:
   a mower body;
   a drive source mounted on the mower body;
   a cutter blade driven by the drive source for rotation, the cutter blade having airlifts at opposite ends thereof; and
   a grass bag disposed on the rear of the mower body for receiving grass cut by the cutter blade;
   wherein the mower body comprises
      a cutter deck having a hollow interior opening downward and accommodating the cutter blade in a rotatable manner within the hollow interior;
      a grass carrying passage extending rearward from the rear of the cutter deck to the grass bag and having one end opening to the hollow interior of the cutter deck for guiding grass cut by the cutter blade into the grass bag, the grass carrying passage being disposed on one of the left or right sides of the mower body with respect to a longitudinal centerline of the mower body; and
      an air return passage for guiding only air from the grass bag into the hollow interior of the cutter deck;
      the air return passage being formed on an upper surface of the cutter deck and having at least one cutter deck-facing opening connected to the hollow interior of the cutter deck and arranged in line with the rotating track of the airlifts, the at least one cutter deck-facing opening being disposed on the other of the left or right sides of the mower body.

2. A lawn mower as set forth in claim 1, wherein the cutter deck-facing opening is oriented such that air jetting out from the opening is in line with a flow of air inside the cutter deck produced by rotation of the cutter blade.

3. A lawn mower as set forth in claim 1, wherein the cutter deck-facing opening comprises two openings formed by cutting and bending downward a portion ahead of the midpoint thereof and cutting and bending upward a portion behind the midpoint.

4. A lawn mower as set forth in claim 1, wherein the air return passage has a grass bag-facing opening connected to the grass bag and opened upward.

5. A lawn mower as set forth in claim 1, wherein the grass bag comprises an upper chamber and a lower chamber separated by a permeable partition wall the upper chamber being connected to the air return passage and the lower chamber being connected to the grass carrying passage.

6. A lawn mower as set forth in claim 1, wherein the cutter deck-facing opening is formed so as not to protrude from an upper surface of the cutter deck.

7. A lawn mower as set forth in claim 1, wherein the cutter deck-facing opening has a front end cut and bent upward and a rear end cut and bent downward.

8. A lawn mower, comprising: a mower body having a front, a rear and two opposed sides; a drive source mounted on the mower body; a cutter blade connected to be rotationally driven by the drive source for cutting grass during use of the lawn mower; and a grass bag extending rearwardly of the mower body for receiving grass cut by the cutter blade; wherein the mower body includes a cutter deck having a hollow interior which opens downwardly and which accommodates therein the cutter blade, a grass discharge passage having one end opening to the hollow interior of the cutter deck at one of the two sides of the mower body and another end opening to the grass bag for discharging grass cut by the cutter blade together with air produced by rotation of the cutter blade into the grass bag, and an air return passage having one end opening to the grass bag and another end opening at one or more locations to the hollow interior of the cutter deck at the other of the two sides of the mower body for returning air from the grass bag to the hollow interior of the cutter deck.

9. A lawn mower according to claim 8; wherein the other end of the air return passage opens at plural locations to the hollow interior of the cutter deck.

10. A lawn mower according to claim 9; wherein the cutter blade has upwardly extending airlifts at opposite ends thereof so that the airlifts travel in a circular path during rotation of the cutter blade; and wherein the locations where the other end of the air return passage opens to the hollow interior of the cutter deck are vertically aligned with the circular path of travel of the airlifts.

11. A lawn mower according to claim 8; wherein the cutter blade has upwardly extending airlifts at opposite ends thereof so that the airlifts travel in a circular path during rotation of the cutter blade; and wherein each of the locations where the other end of the air return path opens to the hollow interior of the cutter deck is vertically aligned with the circular path of travel of the airlifts.

12. A lawn mower according to claim 11; wherein the opening at the other end of the air return passage is oriented so as to return air to the hollow interior of the cutter deck in a direction the same as the direction of air flow inside the cutter deck produced by rotation of the cutter blade.

13. A lawn mower according to claim 8; wherein the opening at the other end of the air return passage is formed in an upper surface of the cutter deck and does not protrude above the upper surface of the cutter deck.

14. A lawn mower according to claim 8; wherein the opening at the other end of the air return passage is formed in an upper surface of the cutter deck by cutting and bending upward a portion of the upper surface to define a front portion of the opening and cutting and bending downward another portion of the upper surface to define a rear portion of the opening.

15. A lawn mower according to claim 8; wherein the opening at the other end of the return passage is formed in an upper surface of the cutter deck by cutting and bending downward a portion of the upper surface ahead of a midpoint of the opening and cutting and bending upward a portion of the upper surface behind the midpoint.

16. A lawn mower according to claim 8; wherein the grass bag has an air permeable partition wall separating the interior of the grass bag into an upper chamber connected to the one end of the air return passage and a lower chamber connected to the other end of the grass discharge passage.

* * * * *